(12) United States Patent
Gross

(10) Patent No.: US 11,034,263 B2
(45) Date of Patent: Jun. 15, 2021

(54) FLEXIBLE RAIL SYSTEM FOR FASTENING OF OBJECTS ON A FLOOR IN A CABIN OF A VEHICLE

(71) Applicant: Airbus Operations GmbH, Hamburg (DE)

(72) Inventor: Claus-Peter Gross, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 429 days.

(21) Appl. No.: 16/160,827

(22) Filed: Oct. 15, 2018

(65) Prior Publication Data

US 2019/0047443 A1 Feb. 14, 2019

Related U.S. Application Data

(63) Continuation of application No. PCT/EP2017/061849, filed on May 17, 2017.

(30) Foreign Application Priority Data

May 19, 2016 (DE) .......................... 102016109219.3

(51) Int. Cl.
*B60N 2/07* (2006.01)
*B64D 11/06* (2006.01)
*B60N 2/015* (2006.01)

(52) U.S. Cl.
CPC ............ *B60N 2/07* (2013.01); *B60N 2/01516* (2013.01); *B60N 2/0732* (2013.01); *B64D 11/0696* (2013.01)

(58) Field of Classification Search
CPC ............ B60N 2/01575; B64D 11/0696; B61D 45/001

(Continued)

(56) References Cited

U.S. PATENT DOCUMENTS 2,589,922 A * 3/1952 Bowman .............. B60N 2/0712
248/502
3,381,927 A * 5/1968 Stamates ............ B64D 11/0696
248/429

(Continued)

FOREIGN PATENT DOCUMENTS

DE 102004029605 A1 12/2005
DE 102009004987 B4 5/2014

(Continued)

OTHER PUBLICATIONS

International German Searching Authority, International Search Report for Patent Application PCT/EP2017/061849, dated Aug. 16, 2017.

(Continued)

*Primary Examiner* — Joshua J Michener
*Assistant Examiner* — Michael B. Kreiner
(74) *Attorney, Agent, or Firm* — Nixon & Vanderhye P.C.

(57) ABSTRACT

A rail system for a vehicle includes a floor rail integratable into or onto the floor, first elongate movement rail elements, second elongate movement rail elements, holding devices to hold the movement rail elements on the floor rail, and gliders supportable on the movement rail elements in a gliding manner. The movement rail elements have a rail profile cross-section perpendicular to their main extension axis; the cross-section has an undercut that faces laterally outwards. The movement rail elements each have two opposed end faces, which can be brought into contact with end faces of other movement rail elements, such that at least one continuous movement rail with a constant rail profile cross-section is created. The gliders include a recess corresponding to the rail profile cross-section for gliding support.

12 Claims, 2 Drawing Sheets

(58) Field of Classification Search
USPC .................................. 410/101, 104, 105, 116
See application file for complete search history.

(56) References Cited

U.S. PATENT DOCUMENTS

| | | | | |
|---|---|---|---|---|
| 3,757,059 | A * | 9/1973 | Falkiner-Nuttall | B60M 1/30 |
| | | | | 191/29 R |
| 5,236,153 | A * | 8/1993 | LaConte ............... | B60P 7/0815 |
| | | | | 244/118.6 |
| 6,260,813 | B1 * | 7/2001 | Whitcomb ......... | B64D 11/0696 |
| | | | | 244/118.6 |
| 9,902,498 | B2 * | 2/2018 | Gensch ............. | B60N 2/01575 |
| 10,351,023 | B2 * | 7/2019 | Hoshide ................. | B60N 2/08 |
| 10,703,486 | B2 * | 7/2020 | Olulana ................. | B60N 2/015 |
| 10,822,093 | B2 * | 11/2020 | Gross .................. | B60N 2/0725 |
| 2008/0197234 | A1 * | 8/2008 | Wilhelm .................. | B64C 1/20 |
| | | | | 244/118.6 |
| 2009/0308672 | A1 * | 12/2009 | Soldatos ................ | A61G 5/047 |
| | | | | 180/65.1 |
| 2011/0309195 | A1 * | 12/2011 | Bishop ..................... | B64C 1/20 |
| | | | | 244/118.6 |
| 2018/0194476 | A1 * | 7/2018 | Gross ................. | B64D 11/0696 |
| 2018/0370635 | A1 * | 12/2018 | Itzinger ................ | B60N 2/3065 |
| 2019/0092478 | A1 * | 3/2019 | Gilbert ............... | B64D 11/0696 |

FOREIGN PATENT DOCUMENTS

| | | |
|---|---|---|
| DE | 102013103662 A1 | 10/2014 |
| EP | 1593548 A2 | 11/2005 |
| WO | 2011134640 A1 | 11/2011 |

OTHER PUBLICATIONS

German Searching Authority, Search Report for German Patent Application 10 2016 109 219.3, dated Mar. 7, 2017.

* cited by examiner

FLEXIBLE RAIL SYSTEM FOR FASTENING OF OBJECTS ON A FLOOR IN A CABIN OF A VEHICLE

CROSS-REFERENCE TO PRIORITY APPLICATIONS

This application is a continuation of international patent application number PCT/EP2017/061849, having an international filing date of May 17, 2017, which claims priority to German patent application number DE 102016109219.3, having a filing date of May 19, 2016. The content of the referenced applications is incorporated by reference herein.

TECHNICAL FIELD

Embodiments of the invention relate to a rail system for fastening of objects on a floor in a cabin of a vehicle, an aircraft, comprising a cabin having a floor and a rail system installed therein as well as a method for fastening of an object on a floor in a cabin of an aircraft.

BACKGROUND

Usually, in vehicles, which serve the transport of passengers, passenger seats and other installations are fastened on floor rails, which have fasteners arranged in a certain raster. Different fastening positions on the floor rails may be realized through the raster. A fastening of the respective object at a desired position is usually conducted through an arresting device, which conducts a form and/or force fitting arresting with fasteners of the floor rail.

Also, in particular in aircraft, it is known to set a distance between seats that follow on each other in a longitudinal direction depending on a desire or a temporary request and to change it occasionally or frequently. For this, the arresting devices of the respective seats are released, afterwards the seats are moved along the floor rail and the arresting devices are arrested again. Changing the distance particularly between two passenger seats arranged behind each other, the seating class of the respective section in the passenger cabin may be changed.

Patent publication DE 10 2009 004 987 B4 shows a movable seat for a transportation means or vehicle, having a seat frame for movably mounting on a support structure of the transportation means, wherein the seat is designed in such a manner that two seats arranged behind each other in the transportation means in a storage state, in which the seats are pushed together and at least partially into each other, comprise a smaller common base surface than in a pushed apart use state.

Patent publication DE 10 2013 103 662 A1 shows a holding device for fastening passenger seats in a transportation means, which device comprises a seat leg fixation element, a gliding element and a rail element.

BRIEF SUMMARY

The integration of movably arranged seats or other installations in a cabin of a vehicle may be improved through utilizing a glide rail, along which the seats are movable and fastenable. It is an object of the disclosure to propose a rail system for fastening objects on a floor in a cabin of a transportation means (i.e., a vehicle), which allows a simple adaption to different positions and a quick reconfiguration of a cabin layout of a vehicle and allows a simple maintenance or modifications of objects at the same time.

The object is met by a rail system having the features of independent claim 1. Advantageous embodiments and further improvements may be gathered from the sub-claims and the following description.

A rail system for a fastening objects on a floor in a cabin of a vehicle is proposed, the rail system comprising at least one floor rail integratable into or onto the floor, a plurality of first elongate movement rail elements, a plurality of second elongate movement rail elements, a plurality of holding elements or devices for holding of first and second movement rail elements on the floor rail, a plurality of gliders that are supportable on the first and second movement rail elements in a gliding manner. The first and second movement rail elements comprise a rail profile cross-section perpendicular to their main extension axis, which cross-section comprises at least one undercut that faces laterally outwards. The first and second movement rail elements each comprise two opposed end faces, which can be brought into a surface contact with end faces of other first or second movement rail elements, such that at least one continuous movement rail with a constant rail profile cross-section is created. The gliders comprise a recess that corresponds to the rail profile cross-section for a gliding support. The sum of lengths of a first elongate movement rail element and of a second movement rail element are in a range of 26 inch (approximately 66 cm) to 100 inch (approximately 254 cm). Hereby, the length of a second movement rail element is below the length of a first movement rail element.

Hence, a movement rail may be provided by means of the rail system, which movement rail is positionable on a floor in a cabin of a vehicle. For this purpose, an alternating sequence of first and second movement rail elements is fastened on a floor rail through a plurality of holding devices, such that the assembled movement rail comprises a main extension direction, which corresponds to the main extension direction of the floor rail. In particular, this is exemplarily measured parallel to a longitudinal axis of the cabin of the respective vehicle.

The movement rail elements are to be considered as separately provided elongate sections of a movement rail, which may be strung together virtually over unlimited lengths and, in doing so, each required length in a cabin of the vehicle may be realized. Hence, the movement rail is segmented. The movement rail allows a gliding motion of gliders arranged thereon along the extension direction of the movement rail and, consequently, along all movement rail elements. The expression "at least" is directed to the fact, that also a plurality of movement rail elements may be arranged parallelly to each other or that groups of movement rails may be arranged in different cabin regions of the vehicle.

The holding devices serve for fastening the movement rail elements on the floor rail and are to be chosen in a manner that a full introduction of the loads, which arise from mass and inertia forces, into the floor rail and, consequently, into the structure of the vehicle is ensured. Depending on the design of the holding devices, the movement rail elements may comprise a length, which is determined through a length raster, which corresponds to a raster of the floor rail.

A floor rail as described here may exemplarily correspond to a "Douglas rail", which is common in aircraft design and comprises an elongate extension and exemplarily includes a flat, belt-like base, onto which two cantilevers are placed, which are arranged at a distance to each other and are separated by means of a slot, which cantilevers together with the base enclose a flat hollow space. Furthermore, the slot is penetrated by raster openings, which are arranged along the floor rail and placed at a predetermined distance to each other, which is exemplarily 1 inch, wherein the raster openings extend through the cantilevers. Usually, these raster openings serve for inserting mushroom-like arresting elements of a holding means, which is arranged on the cantilevers, into the hollow space, to move it into a neck region having a low local distance of both cantilevers between two adjacent raster openings and to subsequently clamp it with the cantilevers through exerting a force. The length raster of the movement rail elements may be adapted to such a raster in the floor rail. The floor rail is mechanically connected to a supporting structure of the vehicle, such that loads from the floor rail are introducible into the structure of the vehicle.

As an alternative, the floor rail may merely be an elongate component connected to the structure of the vehicle, which component merely serves as receptacle for a movement rail. This may be arranged on, in or underneath the floor and provide holding points, on which the holding means of the movement rail system are fastenable. Such an elongate component may also be a structural component itself, which is arranged underneath the floor, extends into the floor and/or is accessible from the floor through respective fastening means.

The movement rail elements comprise a profile cross-section perpendicular to their extension axis and comprise a base surface, which is placeable onto a top side of the floor rail. The profile cross-section extends perpendicularly to the base surface and, consequently, to the top side of the floor rail when the movement rail is placed onto it or mounted to it. An undercut in the profile cross-section, which is realized through lateral neckings, recesses, constrictions or the such, allows to generate a form-fit between a glider and the movement rail element in a direction facing away from the floor rail, which prevents a lifting off of the glider from the movement rail element and constricts the movement of the glider to a direction exclusively along the main extension. The profile cross-section may furthermore be realized to be constant along the main extension direction of the movement rail element, thereby facilitating the manufacturing and mounting of the movement rail elements. Consequently, the holding forces between the glider and the movement rail elements are symmetrically too, such that a kind of dovetail guide may result and such that a correct alignment of the movement rail elements as well as the glider is not necessary during the mounting.

A glider serves for receiving of a section of an object to be fastened on the seat rail in a load carrying manner and may comprise an arresting device, which is arrestable on the seat rail. For example, a joint, a flange or an opening on a seat frame, which is adapted for carrying passenger seats or the such, may be connected to a glider. Thereby, the object is variably positionable along the movement rail and may be arrested at a desired position, depending on the detail design of the movement rail. In particular, the design of the rail system relates to the position variable integration of passenger seats in a cabin.

The sum of the lengths of the movement rail elements is adapted in such a way, that a usual seat distance (also known as "seat pitch") and/or a double and/or a triple usual seat distance is covered through a combination of a first and a second movement rail element. For meeting safety regulations, exemplarily seat distances below 26 inch are not permitted, while seat distances of 34 inch to 39 inch are not unusual for a dense seating. In higher seating classes, seat distances above 92 inch are virtually unknown.

The goal of the combination of longer first movement rail elements and shorter second movement rail elements lies in that particularly for each passenger seat row and/or each second passenger seat row and/or each third passenger seat row, a second movement rail element is provided, which may easily be removed from a combined movement rail if desired, in order to easily remove a glider that is glidingly supported on the movement rail, without having to move the glider up to an end of the movement rail in a respective cabin section. At the same time, the conception of the rail system allows a selective insertion of a passenger seat row by a temporary removal of a second movement rail element.

Altogether, the movement rail system according to the disclosure allows an advantageous fastening of objects on a floor in a cabin of a vehicle, with which the objects are easily movable along a main extension direction and may selectively be removed through gliders arranged thereon from a movement rail or may be inserted therein. An extensive movement of the respective object and/or of other objects for reaching an end of a movement rail is not required.

Besides a simplified maintenance or a simple replacement of movement rail elements themselves, respectively, it is consequently also easily possible to remove excessive seats or seat rows, respectively, or other objects fastened to the movement rail during the reconfiguration of the layout in the cabin by increasing the seat distances, or to insert additional seats or seat rows, respectively during the reduction of the seat distances.

In a particularly advantageous embodiment, the sum of lengths of a first elongate movement rail element and a second movement rail element is in a range of 26 inch (about 66 cm) to 40 inch (about 102 cm). Hereby, a usual seat distance for a densely furnished class may be represented, for which a second movement rail element is present in each case.

In this context, it is to be noted that for adaption to one or a plurality of respective seat distances, also the selective shortening of a first and/or second movement rail element may be possible. As an alternative or additional thereto, it would be conceivable to conduct the adaption to desired seat distances through a conception of the individual lengths of the first and/or second movement rail elements. If the floor rail exemplarily comprises a raster of one inch, second movement rail elements may be provided, which correspond to three, four or five raster distances, while the length of the first movement rail elements may also correspond to exemplarily 32 raster distances. In total, the length of four, five or six inches would result for the second movement rail element, as well as of 33 inches for the first movement rail element, i.e. in total a possible length sum of 37 to 39 inches. Of course, additional lengths for the first and/or the second movement rail element may be provided.

Preferably, the length of a second movement rail element exceeds the length of the recess of a glider. For removing the glider from the movement rail, the recess must be fully removed from engagement with the movement rail. For this purpose, a second movement rail element is removed from a closed movement rail as explained above. Subsequently, the glider will be moved to the place of the removed second rail element. In case the second movement rail element extends over a larger distance than the recess of the glider, the glider hence does not engage with the movement rail any more and may be removed from it. For ensuring a lifting off without any canting, the gap within the movement rail should be sufficiently large.

In case a passenger seat or another object is attached to this glider, the respective device of the object that is connected to the glider may be released from the movement rail. In case the object comprises a plurality of gliders distributed along the movement rail, their mounting on the object should be movable in such a manner that a first glider, which is removed from the movement rail, does not prevent a subsequent gliding motion of a second glider to the place of the removed second movement rail element. The length of the second movement rail element only needs to exceed the recess of the glider about a relatively small amount, exemplarily one or a few centimeters, such that a canting of the glider in the created gap can be prevented. The height of the glider or of the movement rail, respectively, may be crucial for this. The length difference between the second movement rail element and the recess of the glider may be in the magnitude of the height.

It is advantageous if the length of a second movement rail element is 20 cm (about 8 inch) at a maximum. A second movement rail element having such a length may easily be arranged at a free location of a movement rail, which is exemplarily arranged between a back side of a passenger seat and a front side of a passenger seat arranged in front of it. At this location, a good accessibility is given, such that for removing the second movement rail element, a previous movement of a passenger seat for releasing the second movement rail element is not required. Tools for releasing a screw connection of a holding device experiences a sufficient room for maneuvering, and releasing the second movement rail element may be conducted very ergonomically. In case the second movement rail element comprises a significantly larger length, particularly with a dense furnishing, a previous movement of installations may be required.

In an advantageous embodiment, the first and second movement rail elements comprise arresting openings arranged in a longitudinal raster in a top side facing away from the floor rail and at least one of the gliders comprises an arresting device, element, or other means movably supported on the glider and engageable with one of the arresting openings. As the object to be fastened is arranged at one or a plurality of gliders, which in turn are glidably supported along the movement rail, an arresting must be conducted for fixing the object to the fastening rail. By arranging of arresting openings in a longitudinal raster, the object may consequently be arrested at an arbitrary position given by the longitudinal raster. Arresting openings, which extend from a top side facing away from the floor rail of the movement rail towards the floor rail, the insertion of elongate arresting means is allowed. These may be supported at the respective glider along the extension axis of the arresting opening. These may be supported on the respective glider along the extension axis of the arresting opening. It is conceivable that a spring or another means exerts a pre-tension onto the arresting means, such that the arresting means is always held in an arresting opening or latches into such, if the arresting means and the arresting opening are flush to each other. A particularly simple arresting means may be realized in form of a pin or bolt, which is guided in a corresponding borehole in the respective glider. The dimensioning of the arresting means must be conducted under consideration of the expected loads onto the object to be fastened, which are particularly depend on certification rules of the vehicle and the type of the object.

The floor rail may be a seat rail. The holding means may comprise an elongate adapter rail element as well as an arresting element, wherein the adapter rail element is insertable into an opening contour of the floor rail and arrestable there, as well as at least one screwing means for screwing the movement rail elements together with an adapter rail element. In doing so, a common seat rail, exemplarily a previously mentioned "Douglas rail" may be deployed as the floor rail and the rail system according to the disclosure is also capable of retrofitting already existing cabins. Hence, a replacement of an existing floor rail is not required and an ideal load introduction into a floor rail connected to a structure of the vehicle is ensured.

The sum of the lengths of up to 100 inch may also be feasible for utilizing one second movement rail element for exemplarily three seat rows in an economy class, such that only two seat rows at a maximum must be moved for replacing or adding a seat row. Consequently, the additional effort regarding the integration of a second movement rail is limited, also the movement of two seat rows at a maximum.

In an advantageous embodiment, the sum of the lengths of the first movement rail element and the second movement rail element is between 26 inches and 40 inches, particularly preferred between 29 inches and 34 inches, which is roughly the seat distance of two seat rows in an economy class.

In an advantageous embodiment, the first and second movement rail elements comprise end faces that are shaped symmetrically to each other. In doing so, the movement rail elements may be utilized in different orientations, a "front" and "rear" end does not need to be considered during the assembly. Symmetrical end faces may be designed for ensuring the flexibility in such a manner, that removal of a second movement rail element from a movement rail is possible without problems, without having to remove a first movement rail element. It is particularly conceivable to use either simple, perpendicular end faces or end faces, which at a base surface facing the floor rail have a greater length than on a top side facing away from the floor rail. As an alternative or additionally thereto, the base surface may also comprise a smaller length than the top side facing away from the floor rail, such that a second movement rail element is laterally shiftable into the gap between two first movement rail elements.

In a particularly preferred embodiment, the first and second movement rail elements comprise planar end faces that extend perpendicularly to their extension direction. Hereby, laterally shifting into and lifting off from the floor rail of a second movement rail element is possible without further ado.

The disclosure further relates to a vehicle, comprising a cabin having a floor and a rail system for fastening objects installed therein according to the above description In particular, the objects are passenger seats or passenger seat rows, which comprise a seat frame having seat and back cushions arranged thereon. In this regard, a seat frame is a highly loadable mechanical frame construction fastenable on a cabin floor, which primarily serves for providing a base for passenger seats and may receive seat surfaces as well as backrests, which preferably are swivably supportable at the seat frame. In commercial aircraft, seat frames have established, which receive two, three or four seat surfaces and are fastenable on seat rails. Exemplarily, a seat frame comprises two groups of a forward seat leg, a rear seat leg and a diagonal strut extending therebetween each, wherein each group of these components spans a plane that extends perpendicular to the cabin floor. Both groups are at a distance from each other and together support a forward and a rear support tube.

In an advantageous embodiment, the vehicle is realized as an aircraft. This may comprise a cabin having a number of passenger seats or passenger seat rows, respectively, whose quick reconfigurability is facilitated through the rail system according to the disclosure for enlarging or reducing of seat distances. In case of increasing the seat distances, seat rows may easily be removed from the cabin or be installed therein by removing of second movement rail elements.

The disclosure further relates to a method for inserting or removing of an object from a rail system according to the description above, comprising the steps of removing at least one second elongate movement rail element from a movement rail, which includes a sequence of first movement rail elements and second movement rail elements, such that a free end of the movement rail is created, the insertion of a glider at the free end and shifting onto the movement rail or moving a glider off from the movement rail over the free end, as well as the subsequent insertion of the second movement rail element.

In an advantageous embodiment, the object is a passenger seat.

Consequently, the method mentioned is also a method for increasing or reducing of seat distances in a cabin of a vehicle, which comprises the movement of passenger seats arranged on the movement rail prior to the steps mentioned above and in case of reduction of seat distances, the insertion of at least one additional passenger seat onto the movement rail and in case of increasing of seat distances, the removal of at least one passenger seat.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE FIGURES

Other characteristics, advantages and potential applications of the present disclosure result from the following description of the exemplary embodiments illustrated in the figures. In this respect, all described and/or graphically illustrated characteristics also form the object of the disclosure individually and in arbitrary combination regardless of their composition in the individual claims or their references to other claims. Furthermore, identical or similar objects are identified by the same reference symbols in the figures.

DETAILED DESCRIPTION OF EXEMPLARY EMBODIMENTS

Figure 1:
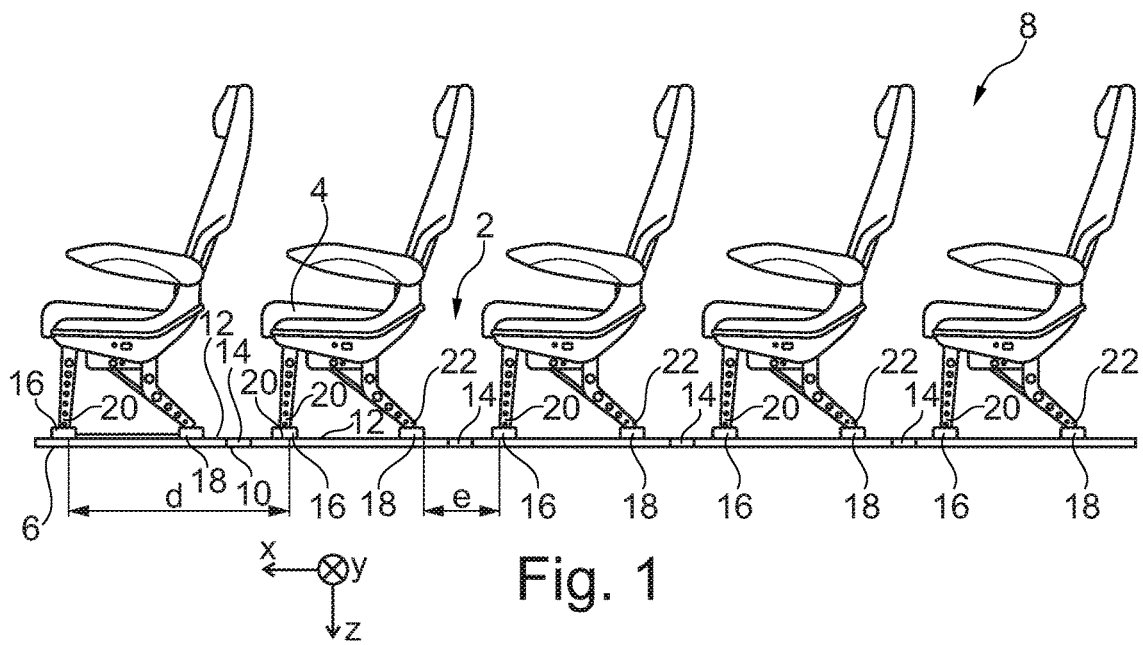
FIG. 1 shows a rail system having passenger seats mounted thereon in a lateral view.

FIG. 1 shows a rail system 2 for fastening of objects 4 in form of passenger seats on a floor 6 in a cabin 8 of an aircraft. A floor rail 10 is arranged on the floor 6, which rail extends in a longitudinal direction x of the cabin 8. First elongate movement rail elements 12 and second movement rail elements 14 are placed on the floor rail 10 in an alternating sequence, such that after each first movement rail element 12 a second movement rail element 14 follows, on which again a first movement rail element 12 connects. The movement rail elements 12 and 14 comprise a main extension direction, which equals the longitudinal direction x.

The passenger seats 4 are coupled with the movement rail elements 12 and 14 by means of glidingly supported gliders 16 and 18. For this purpose, the seats 4 comprise fittings 20 and 22, which preferably allow an at least slight rotation around a y axis, which is transverse to the x-axis. The fittings 20 and 22 may create a unit together with the respective glider 16 or 18, respectively, i.e. they are not separately designed components.

The goal of such an arrangement of movement rail elements 12 and 14 is to be able to selectively release single second movement rail elements 14 from the compound, in order to remove the respective glider 16 and 18 from the movement rail elements 12 and 14. A replacement or insertion of an additional passenger seat 4 is thereby allowed, which does not require the removal of other passenger seats 4.

Figure 2:
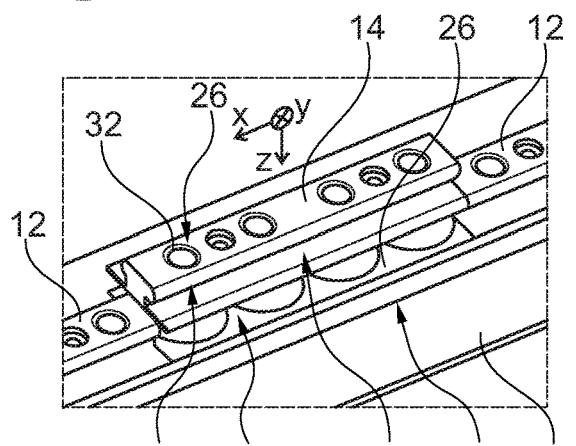
FIGS. 2 and 3 show details of a rail system in three-dimensional views.

In FIG. 2, two first movement rail elements 12 are shown, which are arranged in a distance to each other, between which a second movement rail element 14 is arranged and just removed from the floor rail 10 or inserted into it. The second movement rail element 14 comprises, as the first movement rail elements 12 does, a base surface 24, which rests on a top side 26 of the floor rail 10. Between the base surface 24 and a top side 26 facing away from the floor rail 10, an undercut 28 in form of a necking in a profile cross-section 30 of the movement rail elements 12 or 14 along the x-axis is present. The undercut 28 serves for preventing a lifting-off of a glider 16 or 18 supported on the second movement rail element 14, i.e. from a movement in z-direction. In doing so, a glider 16 or 18, respectively, may merely be moved along the x-axis, wherein forces in z-direction perpendicular to the floor 6 may be absorbed by the second movement rail element 14.

The movement rail elements 12 and 14 comprise arresting openings 32, into which arresting devices or elements may be inserted, which are not shown, in order to prevent a movement of the respective gliders 16 or 18, respectively. Thereby, the objects 4 are held at their predetermined position.

For fastening the movement rail elements 12 and 14, holding devices or elements 34 are provided, which exemplarily comprise an adapter rail element 36 and arresting discs 38, wherein the adapter rail element comprises protrusions 40, which extend through a central slot 44 to the top side 46 of the floor rail 10 when it is inserted into an opening contour 42 of the floor rail and arrested with the arresting discs 38. This is particularly shown in FIG. 3. Here, a glider 18 is further shown, which comprises a receiving borehole 48 having a thread 50 therein, into which the section 22 of a passenger seat 4 is screwable.

As particularly recognizable from FIG. 1, the sum of the lengths of a first movement rail section 12 and a second movement rail element 14 is equal to a seat distances d, which exemplarily is in a range of 26 to 34 inches and particularly preferred in a range of 31 to 33 inches. For allowing a simple removal of a glider 16 or 18, respectively, the length of a second movement rail element 14 should exceed the length of a glider 18 or 16, respectively. However, a too large length is impractical due to a limited distance e between a rear edge of a seat and a front edge of a seat 4 arranged behind it, such that the length of a second rail element 14 may exemplarily be limited to 20 cm.

Figure 3:
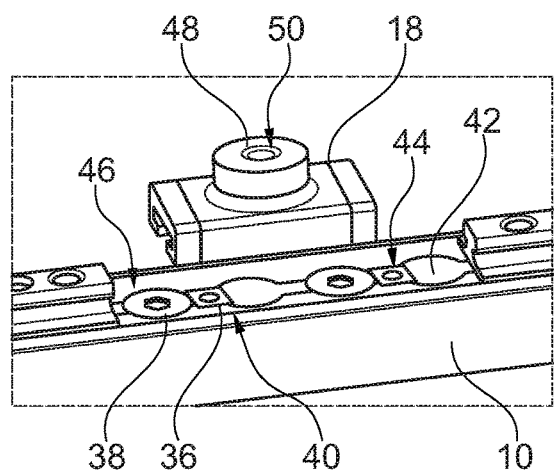
Figure 4:
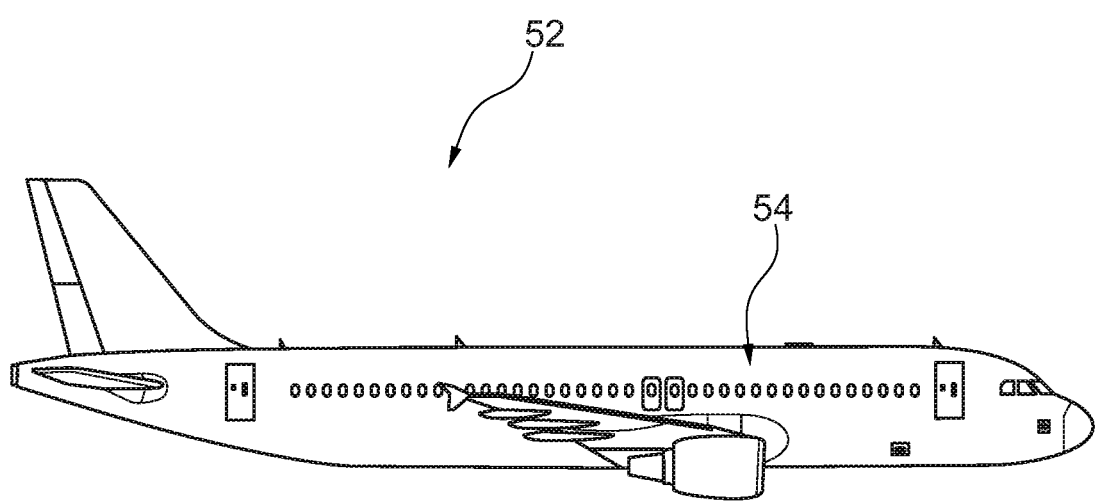
FIG. 4 shows an aircraft having a cabin and a rail system arranged therein.

Finally, FIG. 4 shows an aircraft 52 having a cabin 54 arranged therein, in which a rail system from FIGS. 1 to 3 is integrated, on which a number of passenger seats 4 or passenger seat rows, respectively, are installed.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A rail system for fastening objects on a floor in a cabin of a vehicle, comprising:
   at least one floor rail integratable into or onto the floor;
   a plurality of first elongate movement rail elements;
   a plurality of second elongate movement rail elements;
   a plurality of holding devices for holding of first and second movement rail elements on the floor rail; and
   a plurality of gliders that are supportable on the first and second movement rail elements in a gliding manner;
   wherein the first and second movement rail elements comprise a rail profile cross-section perpendicular to their main extension axis, which cross-section comprises at least one undercut that faces laterally outwards;
   wherein the first and second movement rail elements each comprise two opposed end faces, which can be brought into a surface contact with end faces of other first or second movement rail elements, such that at least one continuous movement rail with a constant rail profile cross-section is created;
   wherein the gliders comprise a recess that corresponds to the rail profile cross-section for a gliding support; and
   wherein the sum of lengths of a first elongate movement rail element and of a second movement rail element are in a range of 26 inch (approximately 66 cm) to 100 inch (approximately 254 cm), wherein the length of a second movement rail element is less than the length of a first movement rail element.

2. The rail system of claim 1, wherein the sum of lengths of a first elongate movement rail element and of a second movement rail element is in a range of 26 inch (about 66 cm) to 40 inch (about 1 m).

3. The rail system of claim 1, wherein the length of a second movement rail element exceeds the length of the recess of a glider.

4. The rail system of claim 1, wherein the length of a second movement rail element is 20 cm at a maximum.

5. The rail system of claim 1, wherein:
   the floor rail is a seat rail;
   the holding device comprises an elongate adapter rail element, which has a shape corresponding to an opening contour of the floor rail and is insertable into the floor rail and arrestable there; and
   the movement rail elements are screwable onto the adapter rail element.

6. The rail system of claim 1, wherein the first and second movement rail elements comprise end faces that are shaped symmetrically to each other.

7. The rail system of claim 1, wherein the first and second movement rail elements comprise planar end faces that extend perpendicularly to their extension direction.

8. A method of inserting or removing an object from a rail system according to claim 1, the method comprising the steps of:
   removing at least one second elongate movement rail element from a movement rail, which comprises a sequence of first movement rail elements and second movement rail elements, such that a free end of the movement rail is created;
   inserting a glider at the free end and shifting onto the movement rail or moving a glider off from the movement rail over the free end; and
   subsequently inserting the second movement rail element.

9. The method of claim 8, wherein the object is a passenger seat.

10. A transportation vehicle comprising:
    a cabin having a floor; and
    a rail system for fastening objects on the floor, the rail system comprising:
      at least one floor rail integratable into or onto the floor;
      a plurality of first elongate movement rail elements;
      a plurality of second elongate movement rail elements;
      a plurality of holding devices for holding of first and second movement rail elements on the floor rail; and
      a plurality of gliders that are supportable on the first and second movement rail elements in a gliding manner;
    wherein the first and second movement rail elements comprise a rail profile cross-section perpendicular to their main extension axis, which cross-section comprises at least one undercut that faces laterally outwards;
    wherein the first and second movement rail elements each comprise two opposed end faces, which can be brought into a surface contact with end faces of other first or second movement rail elements, such that at least one continuous movement rail with a constant rail profile cross-section is created;
    wherein the gliders comprise a recess that corresponds to the rail profile cross-section for a gliding support; and
    wherein the sum of lengths of a first elongate movement rail element and of a second movement rail element are in a range of 26 inch (approximately 66 cm) to 100 inch (approximately 254 cm), wherein the length of a second movement rail element is less than the length of a first movement rail element.

11. The transportation vehicle of claim 10, which is realized as an aircraft.

12. The transportation vehicle of claim 10, wherein the objects are realized as passenger seats.

* * * * *